United States Patent [19]
Shih et al.

[11] Patent Number: 6,004,895
[45] Date of Patent: Dec. 21, 1999

[54] PIGMENTED SILICON NITRIDE

[75] Inventors: Chienchung James Shih, Artesia; Andre Ezis, Vista, both of Calif.

[73] Assignee: Ceradyne, Inc., Costa Mesa, Calif.

[21] Appl. No.: 09/038,746

[22] Filed: Mar. 11, 1998

[51] Int. Cl.$^6$ .................................................. C04B 35/587
[52] U.S. Cl. ........................ 501/97.1; 501/87; 501/97.2; 501/97.3
[58] Field of Search ........................... 501/87, 97.1, 97.2, 501/97.3

[56] References Cited

U.S. PATENT DOCUMENTS

| | | | |
|---|---|---|---|
| 5,399,536 | 3/1995 | Yamakawa et al. | 501/97.2 |
| 5,691,261 | 11/1997 | Takahashi et al. | 501/97.2 |
| 5,804,521 | 9/1998 | Takahashi et al. | 501/97.1 |
| 5,908,796 | 6/1999 | Pujari et al. | 501/97.1 |

*Primary Examiner*—Karl Group
*Attorney, Agent, or Firm*—Leonard Tachner

[57] ABSTRACT

A pigmented silicon nitride composition suitable for hot pressing into near shape articles of manufacture having a cosmetically uniform color. The composition comprises high purity, sub-micrometer, alpha silicon nitride powder mixed with a sintering aid and a pigmenting material. In a preferred embodiment the pigmenting material comprises molybdenum carbide, although carbides of other elements are applicable as well. The resulting hot pressed article is cosmetically superior to non-pigmented silicon nitride. Such articles are especially useful for processing semiconductor components where appearance in the form of color uniformity is a strict requirement for the manufacturer and the customer.

14 Claims, No Drawings

PIGMENTED SILICON NITRIDE

BACKGROUND OF THE INVENTION

1. Field of the Invention

The present invention relates generally to the field of ceramic materials and more specifically to pigmented silicon nitride useful in the manufacture of semiconductor materials.

2. Prior Art

There are advanced ceramic materials that are now required by suppliers of semiconductor processing equipment—the equipment used to manufacture integrated circuits. The need for these new ceramics is primarily driven by chip makers seeking process solutions for 0.25, 0.18 and even finer micron line geometry designs. In part, these solutions require aggressive environments which preclude the use of many traditional materials as structural components in processing chambers. These chambers perform individual unit process steps such as chemical vapor deposition (CVD), plasma etching, rapid thermal processing (RTP), etc.

There are certain types of non-oxide ceramics that have been specifically engineered for these new semiconductor processing applications. One such ceramic is a carefully defined grade of silicon nitride that appears to be very useful as a structural component(s) in plasma etching chambers—a highly corrosive/erosive fluorine gas environment. This application requires a hot pressed grade of silicon nitride that is extremely pure and is very near theoretical density. Unfortunately, this type of silicon nitride, in its natural state, is very light in color and therefore very difficult to manufacture so that the final appearance of the material is cosmetically pure, that is, uniform in a single color particularly if the part is large. Color uniformity is a strict requirement by the semiconductor industry in that it implies quality and manufacturing consistency.

Color uniformity in that fine grade of silicon is very difficult to achieve for many reasons. Reasons for manufactured non-uniformity include:

1) Small chemical variations within the material's grain boundary;
2) The secondary phase, or grain boundary phase, is not uniformly amorphous or not uniformly crystalline;
3) Random formation of silicon crystallites during manufacturing;
4) Preferential solution of carbon or a carbon compound(s) during material processing; and
5) Clustering of micro-porosity within the microstructure of the material thereby producing random color centers.

What is needed is a relatively inexpensive way to chemically pigment the silicon nitride so that its appearance upon manufacturing is uniformly dark, preferably black (most discoloration in silicon nitride is gray to black). Furthermore, the pigment must be chemically and physically inert within the application process. That is, the pigment cannot chemically "react" with the product being produced nor can it cause the generation of particulate during process operation. The pigment can, however, react with the fluorine based gas/plasma in such a manner that the reaction product remains a gas and is therefore "swept out" of the chamber with the fluorine during chamber purging. Again, this gaseous reaction product cannot negatively affect the performance of the process or the manufactured product. It must be totally benign with respect to the process.

SUMMARY OF THE INVENTION

The methodology used for selecting a suitable pigment was primarily based on: 1) chemical and thermal compatibility considerations with silicon nitride; and 2) having the ability (thermodynamically) to react with fluorine so that it forms an inert (process inert) gas readily "purgeable" from the chamber. These requirements considerably narrow the materials that can, therefore, be used as a pigment with/within silicon nitride. Possible materials include carbides and/or nitrides and/or organic compounds of Ta, Mo, W, or Nb. A preliminary design of experiments evaluated the pigmenting (masking) effectiveness of several W and Mo organic compounds as well as the single carbides of Mo, W and Ta. The results and the down selection criteria favored molycarbide, in the form of a micrometer sized powder. Experiments showed that molycarbide, in the form described, is a vary effective and a very "strong" pigmenting material for silicon nitride and can be used in relatively small amounts (less than 5,000 parts per million). Furthermore, the pigmenting process produces a cosmetically-uniform black material without measurably altering the physical and electrical properties of the silicon nitride. Additionally, molycarbide is relatively inexpensive and easily processed with silicon nitride. More importantly, the molycarbide pigmented silicon nitride was tested in a plasma etch chamber, and the results indicated that this new "black" silicon nitride performed as well as the standard grades of silicon nitride.

OBJECTS OF THE INVENTION

It is therefore a principal object of the present invention to provide a material that can be used as a pigment in silicon nitride.

It is another object of the invention to provide a pigmented silicon nitride which will withstand environments to which unpigmented silicon nitride may be successfully subjected.

It is still another object of the invention to provide a black pigmented silicon nitride useful in the manufacture of semiconductor materials.

It is yet another object of to provide a consistently and uniformly colored silicon nitride especially suited for use in processing semiconductor materials.

DETAILED DESCRIPTION OF A PREFERRED EMBODIMENT

The preferred embodiments of the present invention may be generally described as compositions of pigmented silicon nitride ($Si_3N_4$) wherein the silicon nitride comprises roughly 98.5 to 99 percent by weight of the composition, a sintering aid comprises roughly 1 percent by weight of the composition and a pigmenting material comprises the balance (i.e., 0.1 to 0.5 percent weight) of the composition. The composition is preferably formed into near shapes of desired components by hot pressing and then diamond ground to the precise shape and dimensions desired. In one exemplary fabrication process carried out on the inventive mixture, the maximum temperature and pressure were 1780 degrees Celsius and 1500 psi, respectively, and were applied over periods of 1 hour and 5 hours, respectively.

The presently contemplated, preferred compositions of the invention may vary in regard to the precise percentages of respective materials, the sintering aid used and the pigmenting material used. By way of example, the sintering aid may be MgO, $Al_2O_3$ or AlN or combinations thereof. Other possible sintering aids include $Y_2O_3$, $SiO_2$, $Ce_2O_3$, $La_2O_3$, $Yb_2O_3$, $ZrO_2$ and CaO. The pigmenting material may be carbides of various metallic elements including, for example, molybdenum, niobium, holfnium and tantalum. As the presently contemplated best mode of the composition, the sintering aid is MgO (1.0 percent by weight) and the pigmenting material is micrometer sized $Mo_2C$ (0.3 percent by weight), leaving the remainder of the composition (98.7 percent by weight) in high purity, sub-micrometer Alpha $Si_3N_4$. The composition is hot pressed as outlined above and the result is a consistent, uniformly blackened product that is aesthetically pleasing while preserving the high density (better than 99 percent of theoretical maximum) and the other desirable characteristics of the silicon nitride. Having thus described preferred embodiments of the inventive composition, it being understood that the disclosed variations are exemplary and not necessarily limiting,

What we claim is:

1. A pigmented silicon nitride composition suitable for hot pressing into near shape articles of manufacture having a cosmetically uniform color; the composition comprising a powder mixture of:

high purity, sub-micrometer, alpha $Si_3N_4$ in an amount which constitutes at least 98.5 percent of the composition by weight;

a sintering aid which constitutes about 1 percent of the composition by weight; and a pigmenting material which constitutes the balance of the composition.

2. The composition recited in claim 1 wherein said pigmenting material comprises molybdenum carbide.

3. The composition recited in claim 1 wherein said pigmenting material comprises a metal carbide taken from the group consisting of molybdenum carbide, niobium carbide, hafnium carbide and tantalum carbide.

4. The composition recited in claim 1 wherein said pigmenting material constitutes from 0.1 to 0.5 percent of the composition by weight.

5. The composition recited in claim 1 wherein said sintering aid consists of at least one of the materials taken from the group consisting of MgO, $Al_2O_3$, AlN, $Y_2O_3$, $SiO_2$, $Ce_2O_3$, $La_2O_3$, $Yb_2O_3$, $ZrO_2$ and CaO.

6. The composition recited in claim 2 wherein said molybdenum carbide comprises micrometer size particles.

7. The composition recited in claim 1 wherein said color is black.

8. A uniformly colored silicon nitride article of manufacture comprising: high purity $Si_3N_4$ powder mixed with a sintering aid and a pigmenting material, the $Si_3N_4$ powder comprising at least 98.5 percent, the sintering aid comprising about 1 percent, and the pigmenting material comprising the balance by weight of the resulting mixture;

the article being the result of hot pressing the resulting mixture to near net shape and diamond grinding to a shape.

9. The article recited in claim 8 wherein said pigmenting material comprises molybdenum carbide.

10. The article recited in claim 8 wherein said pigmenting material comprises a metal carbide taken from the group consisting of molybdenum carbide, niobium carbide, hafnium carbide and tantalum carbide.

11. The article recited in claim 8 wherein said pigmenting material constitutes from 0.1 to 0.5 percent of the article by weight.

12. The article recited in claim 8 wherein said sintering aid consists of at least one of the materials taken from the group consisting of MgO, $Al_2O_3$, AlN, $Y_2O_3$, $SiO_2$, $Ce_2O_3$, $La_2O_3$, $Yb_2O_3$, $ZrO_2$ and CaO.

13. The article recited in claim 9 wherein said molybdenum carbide comprises micrometer size particles.

14. The article recited in claim 8 wherein said color is black.

* * * * *